United States Patent
Venkata

(10) Patent No.: US 9,880,926 B1
(45) Date of Patent: Jan. 30, 2018

(54) LOG STRUCTURED RESERVED ZONE FOR A DATA STORAGE DEVICE

(71) Applicant: Seagate Technology LLC, Cupertino, CA (US)

(72) Inventor: Sumanth Jannyavula Venkata, Shakopee, MN (US)

(73) Assignee: Seagate Technology LLC, Cupertino, CA (US)

( * ) Notice: Subject to any disclaimer, the term of this patent is extended or adjusted under 35 U.S.C. 154(b) by 625 days.

(21) Appl. No.: 13/971,601

(22) Filed: Aug. 20, 2013

(51) Int. Cl.
*G06F 12/00* (2006.01)
*G06F 13/00* (2006.01)
*G06F 13/28* (2006.01)
*G06F 12/02* (2006.01)

(52) U.S. Cl.
CPC ................... *G06F 12/0246* (2013.01)

(58) Field of Classification Search
CPC ..... G06F 1/00; G06F 2101/00; G06F 12/0246
USPC ........................................................ 711/103
See application file for complete search history.

(56) References Cited

U.S. PATENT DOCUMENTS

| | | | | |
|---|---|---|---|---|
| 4,819,156 A * | 4/1989 | DeLorme | ............ | G06F 11/1471 714/15 |
| 5,720,030 A * | 2/1998 | Kamihara | .......... | G11B 20/1816 714/42 |
| 5,892,633 A * | 4/1999 | Ayres | ................... | G06F 3/0601 360/39 |
| 6,000,006 A * | 12/1999 | Bruce | ................. | G06F 11/1068 711/103 |
| 6,069,827 A * | 5/2000 | Sinclair | ................ | G06F 3/0601 365/185.11 |
| 7,519,628 B1 * | 4/2009 | Leverett | ............ | G06F 17/30067 |
| 8,297,520 B1 * | 10/2012 | Wakerly | ............... | G06Q 20/352 235/487 |
| 8,312,204 B2 | 11/2012 | Zhang | | |
| 8,321,625 B2 | 11/2012 | Weingarten | | |
| 8,612,804 B1 * | 12/2013 | Kang | .................... | G11C 16/349 714/42 |
| 8,898,373 B1 * | 11/2014 | Kang | .................. | G06F 12/0246 711/103 |
| 9,032,165 B1 * | 5/2015 | Brooker | .............. | G06F 12/0806 711/154 |
| 9,047,189 B1 * | 6/2015 | Gupta | ..................... | G06F 11/10 |
| 9,214,963 B1 * | 12/2015 | Garani | ............... | H03M 13/1102 |
| 2002/0031086 A1 * | 3/2002 | Welin | ...................... | G10L 25/78 370/229 |
| 2003/0163633 A1 | 8/2003 | Aasheim | | |
| 2006/0015769 A1 * | 1/2006 | Ikeuchi | ............... | G06F 11/1004 714/6.22 |

(Continued)

*Primary Examiner* — Sheng-Jen Tsai
(74) *Attorney, Agent, or Firm* — Cesari & Reed, LLP; Kirk A. Cesari; Christian W. Best

(57) ABSTRACT

A circuit may be configured to store data to a reserved zone of a non-volatile solid state memory (NVSSM) in a log structured manner and to use information stored in the reserved zone to restore data as needed. In some embodiments, a reserved area of a NVSSM may include die from one or more non-volatile memory modules, which can be divided into blocks and the blocks can be combined to form frames. In some examples, the frames may contain frame headers that can contain a unique identifier which can indicate which frame is to be used to restore data structures, such as during power up or for other restore events.

19 Claims, 8 Drawing Sheets

(56) References Cited

U.S. PATENT DOCUMENTS

| | | | |
|---|---|---|---|
| 2006/0098560 A1* | 5/2006 | Rhyu | G11B 20/1883 369/275.1 |
| 2008/0103972 A1* | 5/2008 | Lanc | G06Q 20/32 705/44 |
| 2008/0133448 A1* | 6/2008 | Molaro | G06F 11/1008 |
| 2008/0301256 A1* | 12/2008 | McWilliams | G06F 12/0284 709/214 |
| 2009/0019245 A1* | 1/2009 | Bondurant | G06F 17/30067 711/161 |
| 2009/0157989 A1* | 6/2009 | Karamcheti | G06F 12/0246 711/156 |
| 2009/0240873 A1* | 9/2009 | Yu | G06F 3/0608 711/103 |
| 2010/0005230 A1* | 1/2010 | Ho | G06F 12/0246 711/103 |
| 2010/0275010 A1* | 10/2010 | Ghirardi | G06F 21/35 713/155 |
| 2011/0066837 A1* | 3/2011 | Lee | G06F 9/4401 713/2 |
| 2011/0239088 A1* | 9/2011 | Post | G06F 11/1068 714/763 |
| 2012/0011340 A1* | 1/2012 | Flynn | G06F 12/0246 711/171 |
| 2012/0221767 A1* | 8/2012 | Post | G06F 13/1673 711/103 |
| 2012/0226962 A1 | 9/2012 | Franceschini | |
| 2012/0303919 A1* | 11/2012 | Hu | G06F 12/0246 711/165 |
| 2013/0028021 A1* | 1/2013 | Sharon | G11C 11/5642 365/185.17 |
| 2013/0073895 A1* | 3/2013 | Cohen | G06F 11/1068 714/6.2 |
| 2013/0339581 A1* | 12/2013 | Olbrich | G06F 13/1657 711/103 |
| 2014/0169093 A1* | 6/2014 | Parat | G11C 16/16 365/185.11 |
| 2014/0310483 A1* | 10/2014 | Bennett | G06F 12/00 711/154 |
| 2015/0052395 A1* | 2/2015 | Wipfel | G06F 11/1451 714/19 |
| 2015/0081961 A1* | 3/2015 | Kwon | G11C 16/10 711/103 |
| 2015/0154121 A1* | 6/2015 | Schmier | G06F 12/1408 713/193 |

* cited by examiner

300

Reserve Data Structure

| Page | Content |
|---|---|
| 0 | None |
| ● ● ● | ● ● ● |
| 27 | Defect map(s) |
| 28 | PE cycle count |
| 29 | Counter(s) |
| 30 | Event log(s) |
| 31 | Frame header(s) |

LOG STRUCTURED RESERVED ZONE FOR A DATA STORAGE DEVICE

BACKGROUND

The present disclosure generally relates to non-volatile data storage memory systems, such as solid state memory devices. Specifically, the present disclosure relates to a log structured reserved zone for a data storage device.

SUMMARY

In certain embodiments, an apparatus may comprise a data storage device and non-volatile solid state memory having a reserved zone including multiple frames that are reserved for system data, each of the multiple frames having a unique identifier. Further, the apparatus may comprise a controller configured to store at least one of the multiple frames in a log structure such that once a last frame of the reserved zone is programmed, the system data is then stored to a first frame of the reserved zone.

In certain embodiments, an apparatus can comprise a controller configured to store data to at least one of a multiple frames in a log structure such that once a last frame is programmed, system data is then stored to a first frame. In addition, the apparatus can comprise a non-volatile solid state memory having a reserved zone comprised of multiple memory modules and multiple frames that are reserved for the system data, each memory module containing multiple memory blocks.

In certain embodiments, a method may comprise storing data to a reserved zone of a non-volatile solid state memory comprised of multiple frames. Moreover, the method may comprise storing the system data to at least one of the multiple frames in a log structure such that once a frame in the log structure is programmed, the system data is then stored to a first frame in the log structure.

DETAILED DESCRIPTION

In the following detailed description of the embodiments, reference is made to the accompanying drawings which form a part hereof, and in which are shown by way of illustrations. It is to be understood that features of the various described embodiments may be combined, other embodiments may be utilized, and structural changes may be made without departing from the scope of the present disclosure. It is also to be understood that features of the various embodiments and examples herein can be combined, exchanged, or removed without departing from the scope of the present disclosure.

Non-volatile solid state memory (NVSSM) may be used as a data storage device and may comprise one or more silicon chips, which can be used in many types of data storage devices such as hybrid storage devices, flash drives, mp3 players, digital cameras, or any other device that might use nonvolatile memory. However, NVSSM may have some limitations; for example, some types of NVSSM have a finite number of program-erase (PE) cycles or program operations that can be performed before wear (i.e. degrading of the ability to store data) affects the integrity of the NVSSM. For this reason and others, a zone of the NVSSM can be reserved for storing system data, which can include defect maps, PE cycle count, event logs, and so forth. Such a reserved zone can be implemented in a manner described herein to manage the wear and keep it substantially level across multiple memory blocks of the NVSSM.

A reserved zone may be a set of physical memory blocks from one or more memory modules (die) in an NVSSM, such as flash, that can be used to store system data. Firmware can determine the size and location of the zone in the NVSSM. In some examples, the location of the zones can be hard coded (i.e. explicitly defined) into the firmware. The memory blocks that form the zone can be located anywhere in the NVSSM, and can, in an embodiment, be contiguous on a memory module, and in another embodiment be non-contiguous and located on many modules.

Figure 1:
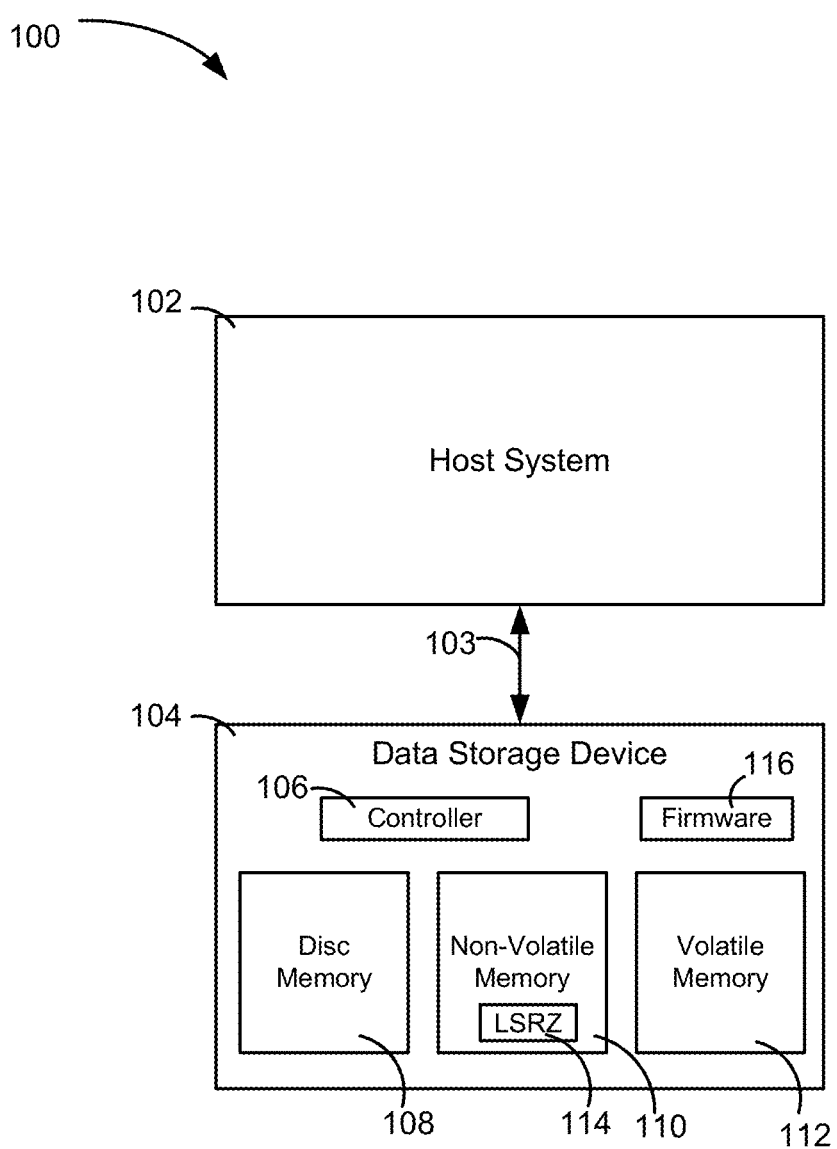
FIG. 1 is a diagram of a log structured reserved zone for a data storage device, in accordance with certain embodiments of the present disclosure.

Referring to FIG. 1, a system for a log structured reserved zone for a data storage device is shown and generally designated 100. In some systems, a host 102 may send data and commands via an interface 103 to a data storage device (DSD) 104. The DSD 104 can be detachable and may be removed from the host via an interface attachment (not shown). The DSD 104 may include a controller 106, and can have different data storage mediums, such as disc memory 108, non-volatile solid state memory 110 (which may be NAND flash), and volatile memory 112. The interface 103 can include a connector (not shown), memory (not shown), memory controller (not shown), or any combination thereof to implement communication protocols between the DSD 104 and the host 102.

The NVSSM may contain a log structured reserved zone (LSRZ) 114 that can include memory blocks designated to store system data for functions, such as PE cycle counting or storage of a frame header containing information such as a unique identifier. When a data failure occurs in the DSD 104 or in another connected data storage device, the system data in the LSRZ 114 can be used to restore the data structures on the affected memory.

The reserved zone can be comprised of one or more memory modules (die). Firmware can group the physical memory blocks of a memory module into a virtual structure called a frame, and the pages of memory within the blocks can store system data.

The LSRZ may contain information to restore data structures during power up, or in the case of a failure such as a power loss. Frames in the zone can include a frame header, and in some embodiments, headers can be located on the last page of the frame. Each time a storage operation is performed on a frame in the zone, the frame can be tagged with a unique identifier (UID) which may be 64-bit in some embodiments. UID values can increase over time, and the frame most recently accessed can have the highest UID value.

In events such as a power ups, system checks, failures such as power loss, or at other determined times or triggers, the controller may scan the frames in the reserved zone for the header with the highest UID. In some embodiments, the controller may scan only the pages in the frames containing the headers and may thus save search time. When the frame with the highest UID is found, a check can be conducted to determine when the frame is valid, and if so (a frame may be invalid when there are read errors), the system data may be used to restore data structures on the affected memory, such as disc memory. When the most recent frame (i.e. the frame with the highest UID) is found to be unusable, the next frame may be used. For example, when a frame with UID=N is invalid, the frame with UID=N-1 can be used instead.

Figure 2:
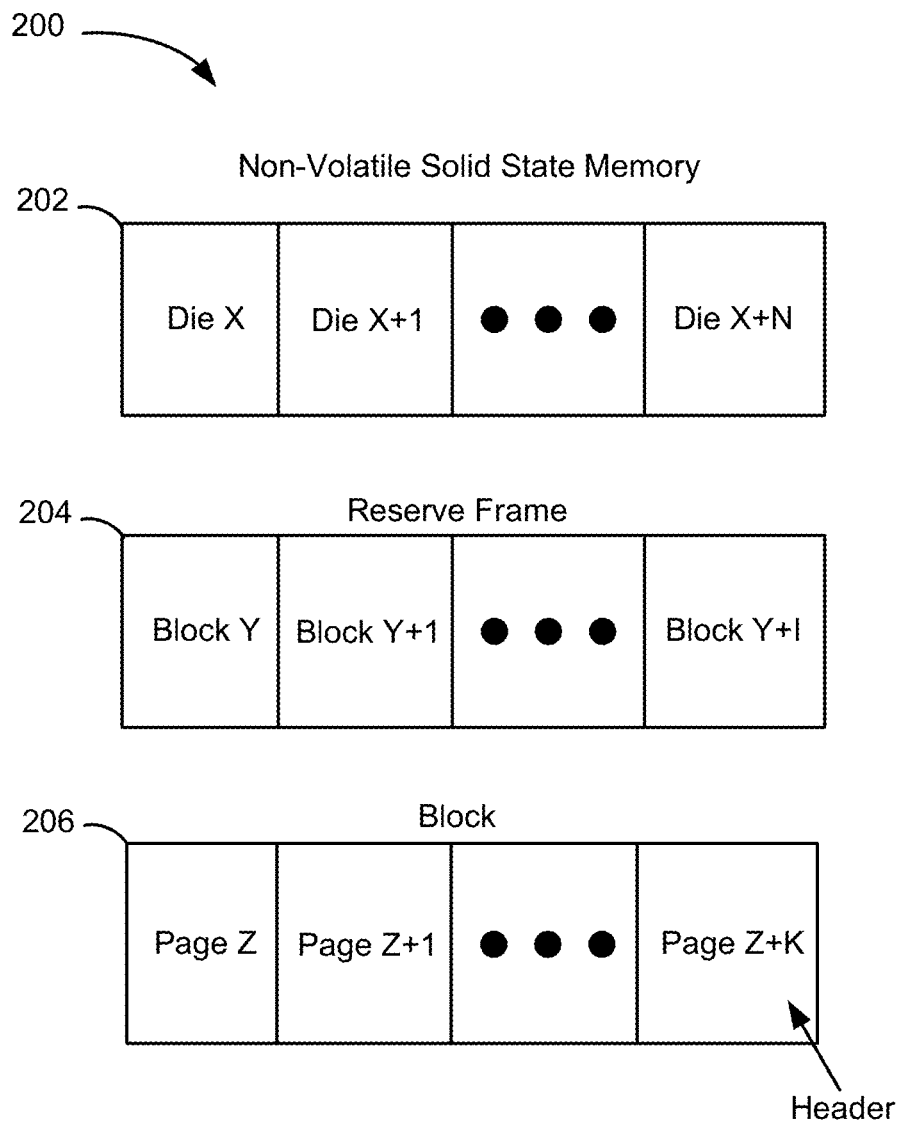
FIG. 2 is a diagram of a log structured reserved zone for a data storage device, in accordance with certain embodiments of the present disclosure.

Referring to FIG. 2, a system for a log structured reserved zone for a data storage device is shown and generally designated 200. NVSSM 202 can include one or more memory modules each having a physically separate silicon die and a NVSSM may have a storage capacity substantially equal to the sum of the storage capacities of the included memory modules, and is illustrated at 202 where each die represents a separate silicon die (i.e. computer chip).

Figure 3:
FIG. 3 is a chart illustrating a log structured reserved zone for a data storage device, in accordance with certain embodiments of the present disclosure.

A frame in the reserved zone 204 can be comprised of memory blocks from one or more die of the NVSSM (see FIG. 4), and can contain a defect map, a PE cycle count, and a header (see FIG. 3). A frame in the reserved zone may contain system data, which can be used to restore data structures during startup, or in case of a failure such as a power loss. The system data may be generated when a defect in the NVSSM is encountered. In some embodiments, the NVSSM can detect a defect when the defect map is updated, which may occur periodically. In other embodiments, a frame may be generated periodically, such as every N writes to the NVSSM. In further embodiments, combinations of detecting defects and periodic determinations may be used to determine when to generate the system data. The data structures may be located on a variety of memory types such as disc memory, dynamic random-access memory (DRAM), and other NVSSM devices. Each frame can have a header that can contain a unique identifier (UID), firmware revision, time stamp, and so forth. Memory blocks in the LSRZ can contain data pages 206, and in some embodiments, the header may be located on the last page (and hence the last block) of the frame.

Referring to FIG. 3, a chart for a log structured reserved zone for data storage devices is shown and generally designated 300. A frame can be comprised of a number of memory blocks in non-volatile solid state memory module. Each block in the frame can contain a number of pages which can be used to store system data. In the embodiment of 300, a frame containing one block is shown. The block can have 32 pages, the first 27 of which may be empty, although in other embodiments, they can contain system data. The remaining five pages may be used to store system data, including defect map(s), PE cycle count(s), counter(s) (can be used to trigger other functions within the DSD), event log(s), a frame header, other system information, or any combination thereof with the frame header.

Figure 4:
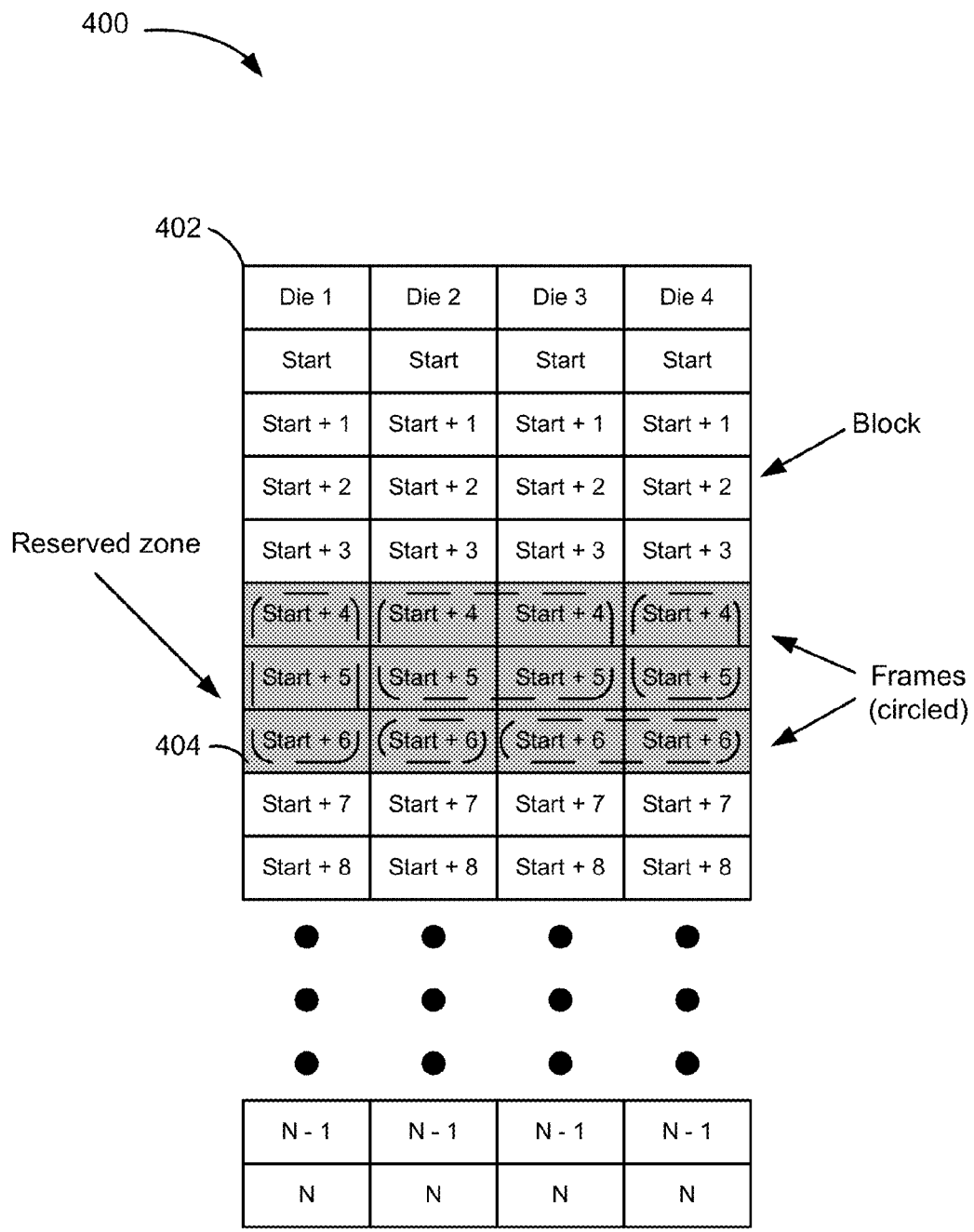
FIG. 4 is a chart illustrating a log structured reserved zone for a data storage device, in accordance with certain embodiments of the present disclosure.

Referring to FIG. 4, a chart for a log structured reserved zone for a data storage device is shown and generally designated 400. In the example shown in the data storage device 400, a NVSSM module 402 may contain four die and N blocks, although in other embodiments, there can be other combinations of numbers of die and numbers of blocks. Blocks start+4 through start+6 in each die can be designated as a reserved zone and firmware can group the blocks into one or more frames, at 404. In some embodiments, a single frame may be wholly located on one die, while in other embodiments, a frame can span multiple die. In yet other embodiments, there can be multiple frames located on a single die.

NVSSM devices can have operational lives that may in part be determined by how much wear occurs over the life of the device. A substantially even wear level can be assumed from a result of a substantially equal number of storage operations performed on each block in the reserved zone, while an uneven wear level may result from more storage operations performed on some blocks than others.

Substantially even wear can be achieved by programming the frames in the reserved zone in a log structured manner. By using a log structure, a frame may only be programmed once until the other frames in the reserved zone are programmed. In certain embodiments, frames may start at a reserved zone location X and increment the location by one until the end of the available locations is reached, at which point the location of the next frame may return to X. From time to time, an event may occur, such as a programming error, which may result in a location of the reserved zone being marked as bad and bypassed in the future.

Figure 5:
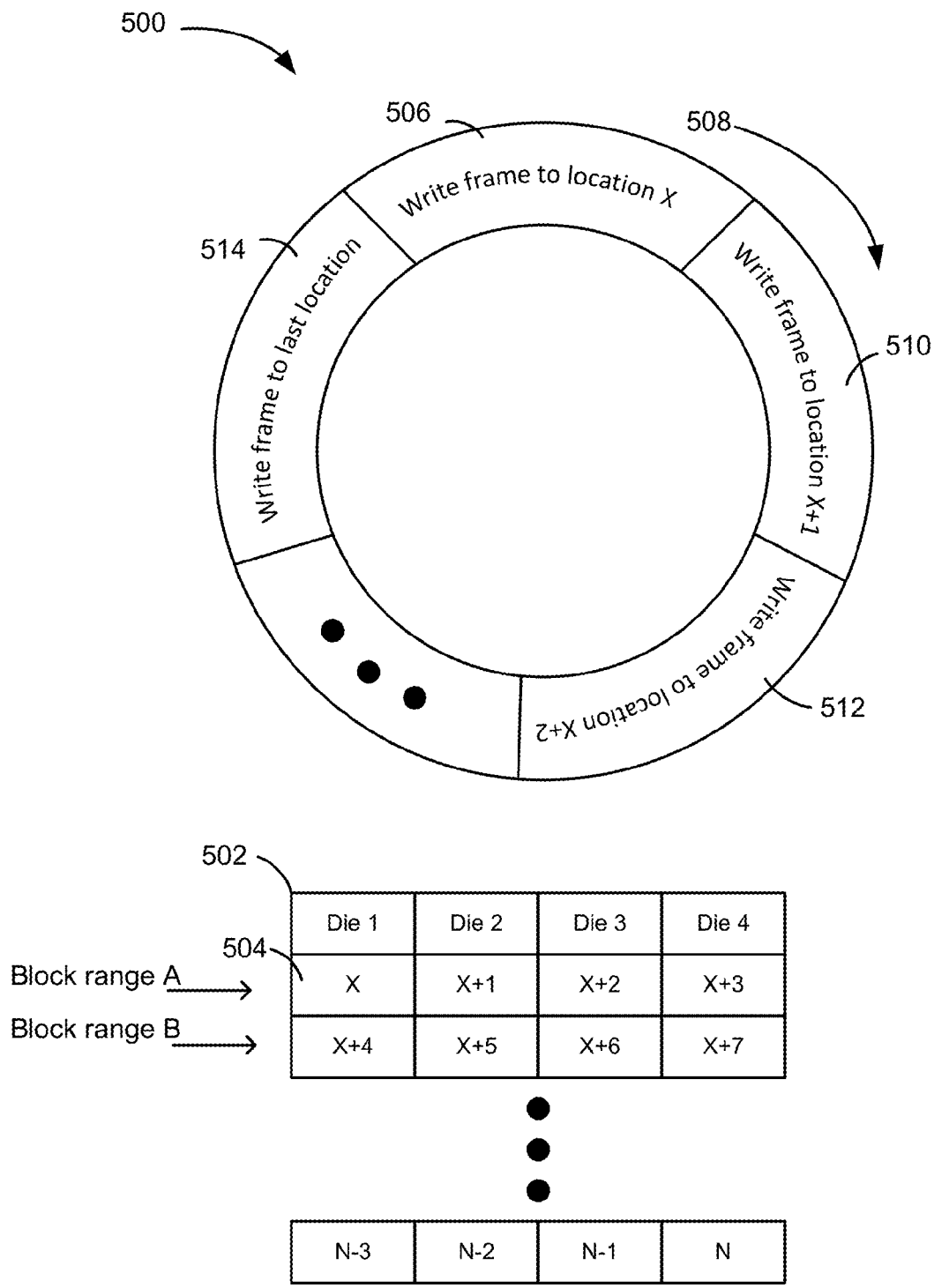
FIG. 5 is a diagram of a log structured reserved zone for a data storage device, in accordance with certain embodiments of the present disclosure.

Referring to FIG. 5, a system for a log structured reserved zone for a data storage device is shown and generally designated 500. An embodiment of a log structured write in an LSRZ 502 can illustrate how log structured data can be used in an NVSSM. In some embodiments, each frame may be located on one die, though this is not required. The first frame can be in location X at 504, and may be incremented by one location until location N at 505 is reached. Once data is written to the frame at location N at 505, the next set of data may be written to the first frame, location X at 504.

A first frame may be programmed to an initial location, X, at 506. Progressing clockwise 508, new system data can be programmed to a frame at location X+1, at 510. The location of each new frame can increment by one so that the next new frame may found at location X+2, at 512, and can continue in this sequence until the last location is reached, at 514, whereupon the location for a frame selected for writing can revert back to the initial location, X.

In the embodiment of NVSSM 502, the frame locations shown are sequential across block ranges and die in the reserved zone; location X could be located in block range A on die 1, location X+1 could be in block range A on die 2, location X+4 could be in block range B on die 1, and so on. In some embodiments, frame locations could be less sequential; location X could be in block range A in die 2, location X+1 could be in block range D in die 4, location X+2 could be in block range C in die 2, and so on.

Figure 6:
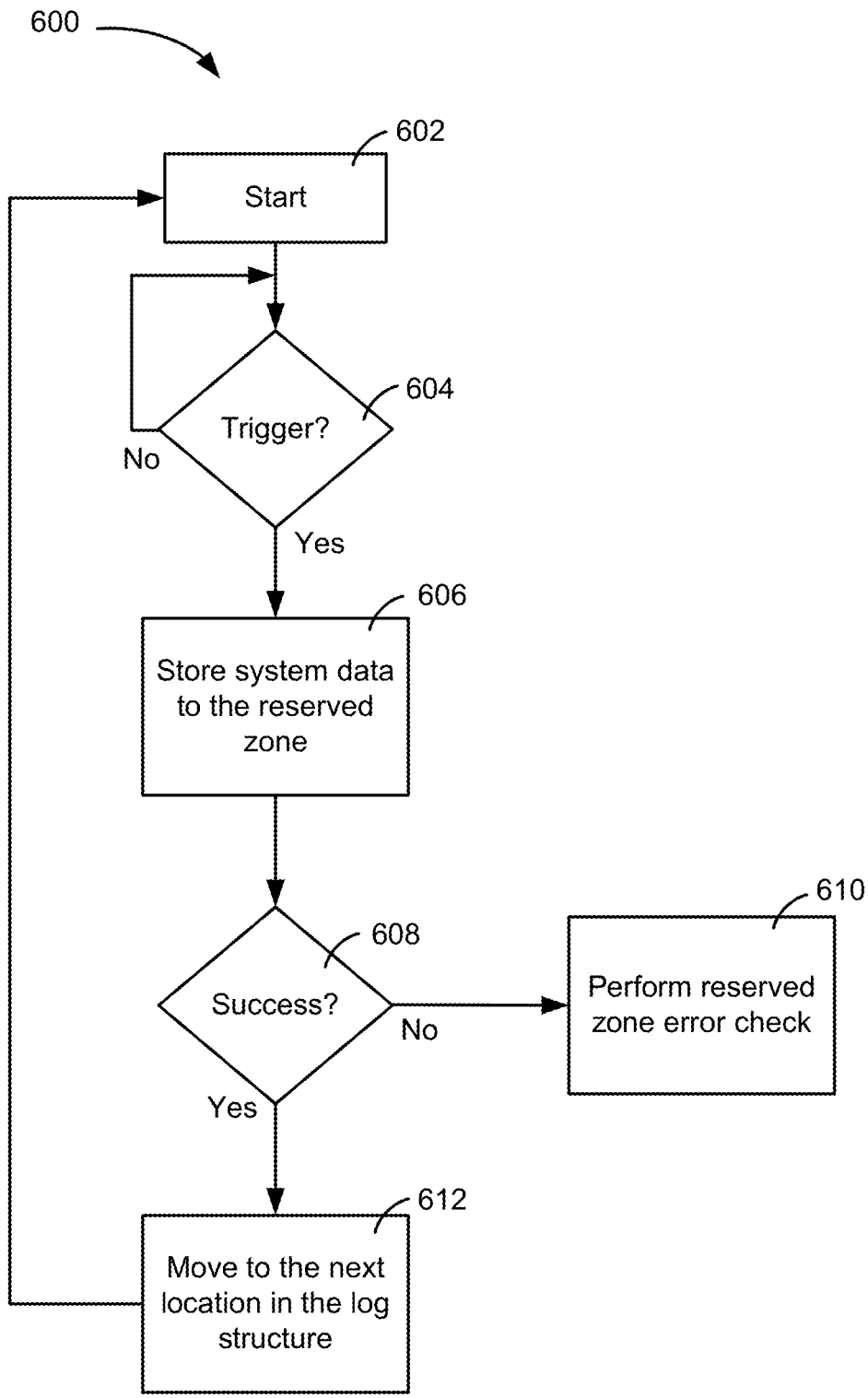
FIG. 6 is a flowchart of a method for use with a log structured reserved zone for a data storage device, in accordance with certain embodiments of the present disclosure.

Referring to FIG. 6, a flowchart of a method for use with a log structured reserved zone for a data storage device is shown and generally designated 600. When the method 600 starts at 602, a controller can designate a location in a reserved zone as starting location X for a first frame. The location of a frame can be independent of the unique identifier (UID), which may be found in a frame header. After a trigger is indicated, at 604, such as N user write commands (a write command can direct data from a host to a memory such as an NVSSM or disc memory), where N can be a threshold value based on the capacity and endurance of a particular NVSSM device, the controller may be triggered to store system data, at 606, associated with the write commands to a frame at location X in the reserved zone.

The process 600 may determine if the system data was successfully stored to the reserved zone, at 608. When using NVSSM as the data storage medium, there may be two steps to a store operation, erase and program, that might need to be confirmed, which could be done separately or together. Generally, the erase operation clears a memory block in preparation for programming (i.e. storing data to). After an erase operation is performed on the blocks of a selected frame, the controller can verify that the erase operation was successful. When the erase operation is successful, the controller can program system data to the block. The process 600 may also verify the program operation is successful. In some embodiments, both verifications may occur, or just one of the two verifications may be done, such as only verifying after the programming step.

When successful programming (i.e. storage) of the blocks in the frame is verified, at 608, the location for storing data in the log structured reserved zone may increment by one to X=X+1, at 612. This process can repeat until the last location in the log structured reserved zone is reached, at which point the location for storing data can revert back to the original location X.

When a store operation is not successful, the controller can perform an error check of the zone to determine the nature of an error, at 610. An error may occur for several reasons, including when data cannot successfully be stored to at least one of the blocks in the frame, or when a threshold number of successive unsuccessful operations occur without an intervening success. In the case where there are one or more physical blocks in the frame that cannot successfully store data, the frame location may be bypassed and may be marked as bad so that it will not be used again (in some embodiments, however, just the blocks can be marked; the frame can still be used). Then, a next location in the log structured reserved zone can be programmed (for example, when location X+2 is corrupt, the log structured reserved zone can include a series of locations of X, X+1, X+3, and so forth. When a threshold number (may be determined by firmware or the host, can changed on the fly) of successive unsuccessful operations occur without an intervening success, the reserved zone can be disabled.

Figure 7:
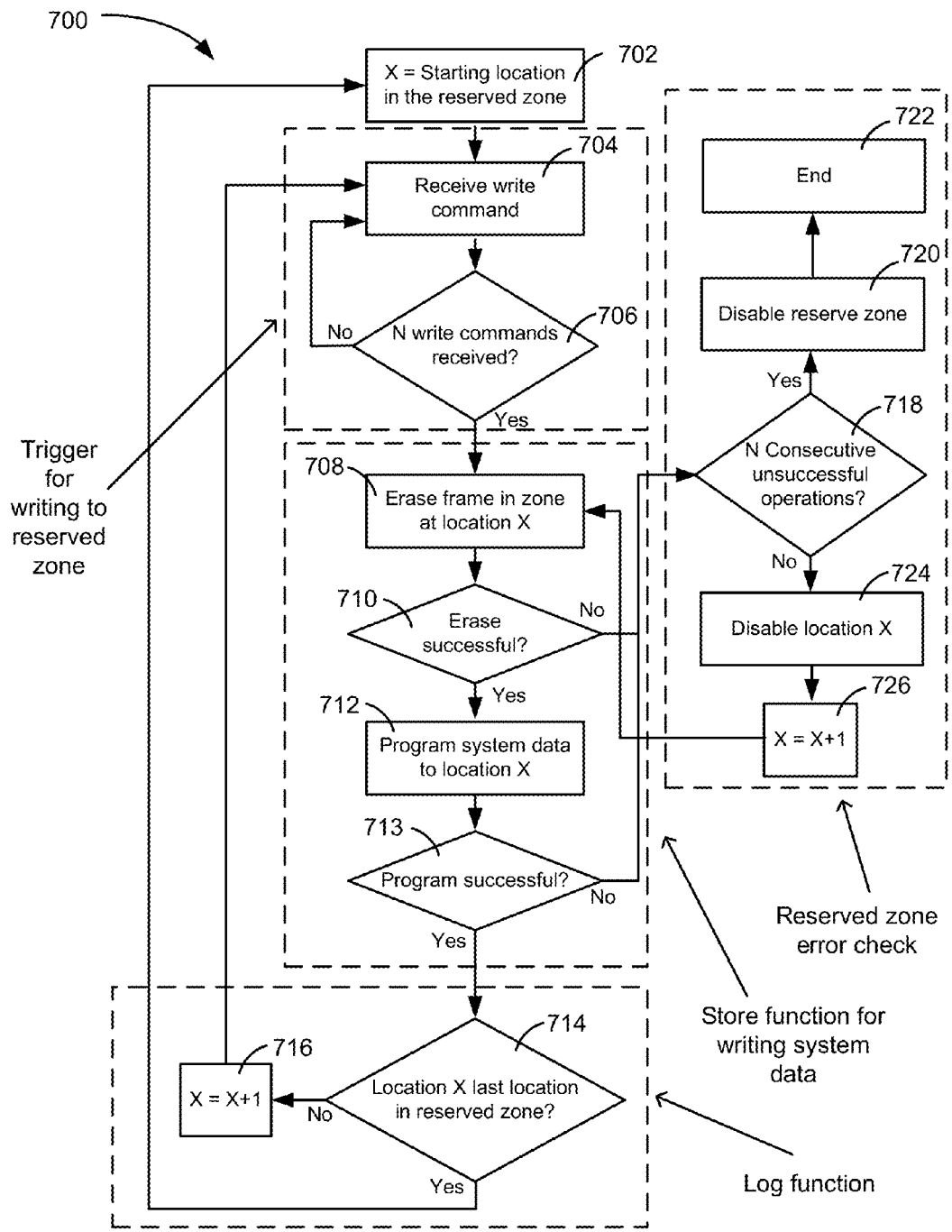
FIG. 7 is a flowchart of a method for use with a log structured reserved zone for a data storage device, in accordance with certain embodiments of the present disclosure.

Referring to FIG. 7, a flowchart of a method for use with a log structured reserved zone for a data storage device is shown and generally designated 700. The process can begin at location X, at 702. Write commands can be received by the data storage device, at 704, and can be held in a queue until N write commands have been received, at 706.

When N write commands have been received at 706, the blocks in a frame at location X can be erased, at 708. When the erase operation is successful, at 710, a program operation to store system data can be performed on the blocks at location X, at 712, and a check can be conducted, at 713, to determine its success.

After a frame has been written, at 712, a check may be conducted to determine if location X is the last location in the LSRZ, at 714. When the latest written location of the LSRZ is the last location within in the LSRZ with respect to starting location X, the process can repeat, at 702, and the LSRZ can again store system data to location X. If the latest written location is not the last location within the LSRZ, the location for storing data can be incremented by one (X=X+1), at 716, and the process may repeat, at 704.

In the event an erase operation is not successful, at 710, or a program operation is not successful, at 713, the nature of the errors can be determined at 718. In some embodiments, step 710 may be bypassed and reserved zone error check may detect whether a program operation was successful by determining if readable data exists within the respective written location. In some instances, a threshold number of successive unsuccessful operations may occur without an intervening success in which case the reserved zone can be disabled, at 720, and the process can end, at 722. In the event that less than N successive unsuccessful operations have occurred, a selected location can be disabled for future use, at 724, and the location can be incremented to the next location, at 726, for the process to attempt to store the system data in a new location of the LSRZ, at 708.

Figure 8:
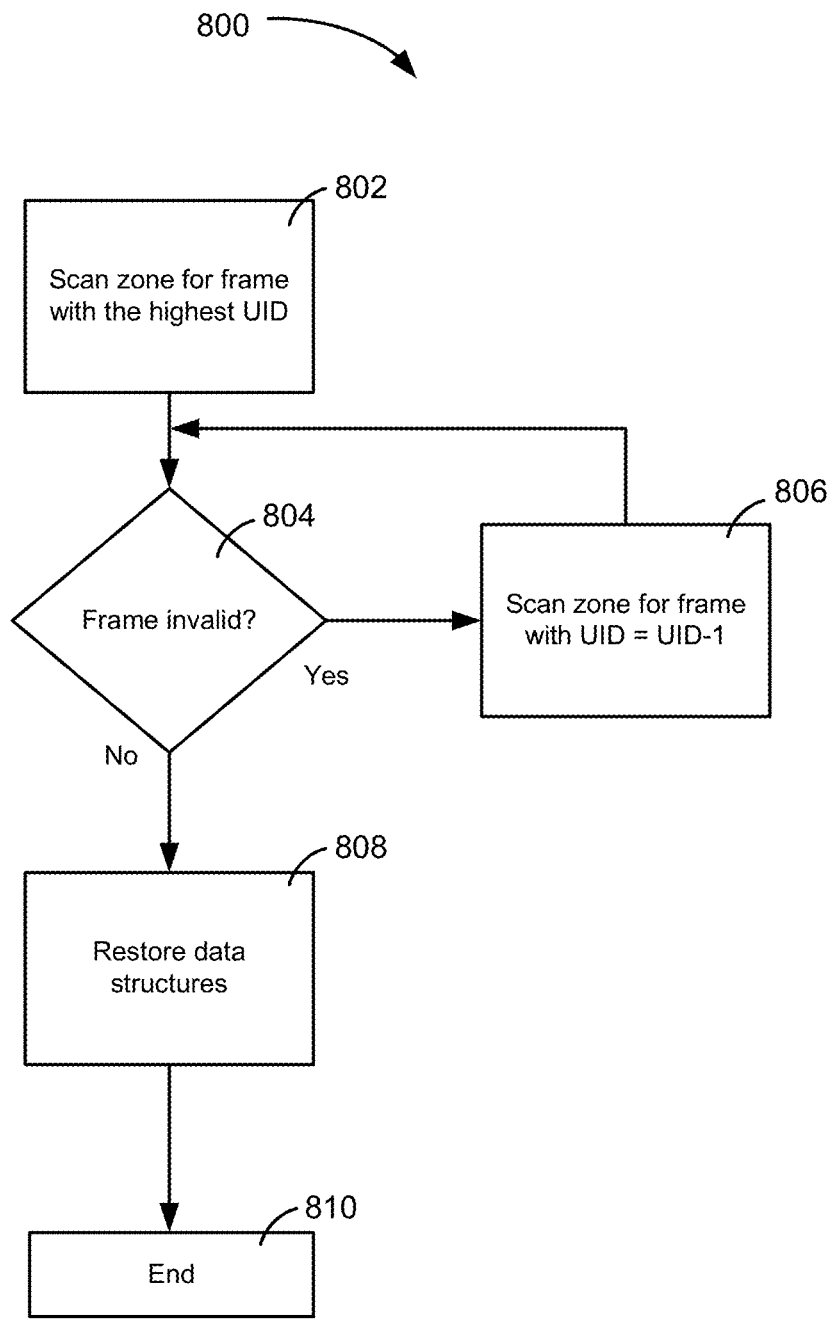
FIG. 8 is a flowchart of a method for use with a log structured reserved zone for a data storage device, in accordance with certain embodiments of the present disclosure.

Referring to FIG. 8, a flowchart of a method for use with a log structured reserved zone for a data storage device is shown and generally designated 800. The process 800 can be used to find an appropriate reconstruction data and can begin by scanning frames in a reserved zone to determine a frame with a highest UID (typically from being previously stored within system data of a respective frame), at 802. A check can be conducted, at 804, to determine when a selected frame is valid, and if so, system data from the selected frame may be used to restore data structures, at 808. In an embodiment, the system data can be used to restore dynamic random-access memory (DRAM) data structures. The process can then end, at 810.

However, when a first selected frame is invalid, a frame with a next highest UID (such as UID-1) can be determined and selected as a second selected frame, at 806. Then, the second selected frame may be used to restore data structures in memory devices, at 808, provided it is valid, at 804. If the second selected frame is not valid, at 804, a further next frame may be selected and so on and so forth until a valid frame is determined or no valid frames exist, in which case data structures may not be able to be restored.

In accordance with various embodiments, the methods and processes described herein may be implemented as one or more software programs running on a computer processor or controller device. In accordance with other embodiments, the methods and processes described herein may be implemented as one or more software programs running on a computing device, such as a personal computer that is using a solid state data storage device, a disc drive, a hybrid drive, or any combination thereof. Dedicated hardware implementations including, but not limited to, application specific integrated circuits, programmable logic arrays, and other hardware devices can likewise be constructed to implement the methods and processes described herein. Further, the methods and processes described herein may be implemented as a computer readable data storage medium, data storage device, or a data storage apparatus including instructions that when executed cause a processor to perform the methods and processes.

The illustrations, examples, and embodiments described herein are intended to provide a general understanding of the structure of various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above examples, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
a data storage device (DSD) including:
nonvolatile solid state memory (NVSSM) having a selected portion of storage capacity designated as a reserved zone of physical memory blocks reserved for system data and distributed across multiple die, the reserved zone divided into multiple frames, each frame having a unique identifier (UID) and including one or more of the physical memory blocks;
a controller configured to:
maintain the reserved zone as a log structured reserve zone distinct from a remaining portion of the storage capacity, such that once a last frame of the reserved zone is programmed, the system data is then stored to a first frame of the reserved zone; and
set a value of the UID for a current frame to be larger than the values of the UIDs of the other frames of the reserved zone each time system data is stored, such that a frame with the largest UID is a most recently programmed frame.

2. The apparatus of claim 1 further comprising the controller configured to:
store the system data to a selected frame in the log structure when a threshold number of write commands are received.

3. The apparatus of claim 2 further comprising the controller configured to:
determine if the system data is successfully stored to the selected frame;
when the system data is successfully stored, select a next frame in the log structure for storing next system data; and
when the system data is not successfully stored, perform an error check for the selected frame.

4. The apparatus of claim 3 further comprising the controller configured to:
count a number of write commands received from a host;
when the threshold number of write commands have been received from the host, the controller is configured to perform a store operation including:
erase the selected frame;
store the system data to the selected frame; and
determine if the system data is successfully stored at the selected frame.

5. The apparatus of claim 4 further comprising the controller configured to:
when the store operation is not successful:
determine when a threshold number of successive unsuccessful store operations has been exceeded;
when the threshold number of successive unsuccessful store operations has been exceeded:

disable the reserved zone such that the DSD can no longer store system data therein;
when there have been less than the threshold number of successive unsuccessful store operations:
disable the selected frame such that the selected frame will not be used for future store operations;
select a next frame in the log structure; and
perform the store operation at the next frame.

6. The apparatus of claim 5 further comprising the controller configured to:
program the selected frame to a selected location;
increment a location of the selected frame by one to a next frame;
program the next frame to another location; and
when the last frame is programmed to a location, select the first frame to store the next system data.

7. The apparatus of claim 6 further comprising the controller configured to:
scan locations in the reserved zone to determine a first frame with a largest UID of the frames;
determine if the first frame is valid;
when the first frame is valid, restore data structures from system data stored within the first frame; and
when the first frame is not valid, determine a second frame having a next largest UID, and when the second frame is valid, restore data structures from system data stored within the second frame.

8. The apparatus of claim 7 further comprising:
the system data in each frame includes:
a defect map;
a program-erase (PE) cycle counter;
one or more counters;
one or more event logs; and
a frame header.

9. The apparatus of claim 8 further comprising the controller configured to:
store a UID in each frame header.

10. The apparatus of claim 9 further comprising the controller configured to:
when a recovery process is triggered, scan only storage locations containing frame headers to determine a frame with the largest UID.

11. An apparatus comprising:
nonvolatile solid state memory (NVSSM) having a reserved zone including multiple memory blocks reserved for system data and distributed across multiple die, the reserved zone divided into multiple frames, each including one or more memory blocks;
a controller configured to:
maintain the reserved zone as a log structured reserve zone, such that once a last frame of the reserved zone is programmed, system data is then stored to a first frame of the reserved zone;
store a unique identifier (UID) in a frame header of each written frame;
set a value of the UID of a current frame to be larger than the values of the UIDs of the other frames of the reserved zone each time system data is stored, such that a frame with a largest UID is a most recently programmed frame;
when a recovery process is triggered, scan storage locations containing frame headers to determine the frame with the largest UID; and
restore data structures from system data stored within the frame with the largest UID.

12. The apparatus of claim 11 further comprising:
the memory blocks in a frame are wholly stored in a die that does not contain blocks from other frames.

13. The apparatus of claim 11 further comprising:
the blocks in a frame are wholly stored in a die that contains blocks from other frames.

14. The apparatus of claim 11 further comprising:
the blocks in a frame are stored in multiple die such that some blocks in the frame are stored in one die and other blocks are stored in another die; and
a portion of the frame is stored on a die that contains portions of another frame.

15. A method comprising:
storing system data to a reserved zone of a nonvolatile solid state memory (NVSSM), the reserved zone having multiple physical blocks distributed across multiple die and reserved for system data, the multiple physical blocks divided among multiple frames;
storing the system data to the multiple frames in a log structure such that once a last frame in the log structure is programmed, the system data is then stored to a first frame in the log structure;
when a store operation is not successful:
  determining a number of successive unsuccessful operations;
  when a threshold number of successive unsuccessful store operations has been exceeded:
    disabling the reserved zone such that the reserved zone can no longer store system data;
  when the threshold number of successive unsuccessful operations has not been exceeded:
    disabling a selected frame such that the selected frame will not be used to store system data; and
    selecting a next frame in the log structure to store the system data.

16. The method of claim 15 further comprising:
implementing the reserved zone across the multiple physical blocks as part of a wear leveling process;
storing the system data to a selected frame in the log structure when a threshold number of write commands are received, the threshold number based on a capacity of the NVSSM;
when the system data is successfully stored to the NVSSM, selecting a next location in the log structure for storing next system data; and
when the system data is not successfully stored in the NVSSM, performing an error check for the selected frame.

17. The method of claim 15 further comprising:
storing a unique identifier (UID) in a frame header of each written frame;
setting a value of the UID for a current frame to be larger than the values of the UIDs of the other frames of the reserved zone each time system data is stored, such that a frame with a largest UID is a most recently programmed frame;
when a recovery process is triggered, determining a valid frame with the largest UID, including:
  scanning locations in the reserved zone to determine a first frame with a largest UID of the frames;
  determining if the first frame is valid based on detected read errors;
  when the first frame is not valid, determining validity of a next frame having a next largest UID until a valid frame is located; and
restore data structures based on system data stored within the valid frame with the largest UID.

18. The Apparatus of claim 11 comprising the controller further configured to:
when a trigger to perform a store operation occurs:
  store system data to a selected frame of the reserved zone;
  determine if the system data is successfully stored at the selected frame; and
  when the store operation is not successful:
    disable the reserved zone when a threshold number of successive unsuccessful operations has been exceeded.

19. The apparatus of claim 18 further comprising:
when the store operation is not successful, the controller further configured to:
  disable the selected frame when there have been less than the threshold number of successive unsuccessful operations;
  select a next frame in the log structure; and
  perform the store operation at the next frame.

* * * * *